US010634183B2

(12) United States Patent
Matthews

(10) Patent No.: US 10,634,183 B2
(45) Date of Patent: Apr. 28, 2020

(54) HOOK SYSTEMS FOR HANGING SCHOOL BAGS

(71) Applicant: John Russell Matthews, Mount Nasura (AU)

(72) Inventor: John Russell Matthews, Mount Nasura (AU)

( * ) Notice: Subject to any disclaimer, the term of this patent is extended or adjusted under 35 U.S.C. 154(b) by 0 days.

(21) Appl. No.: 15/551,388

(22) PCT Filed: Feb. 14, 2016

(86) PCT No.: PCT/AU2016/050096
§ 371 (c)(1),
(2) Date: Aug. 16, 2017

(87) PCT Pub. No.: WO2016/131093
PCT Pub. Date: Aug. 25, 2016

(65) Prior Publication Data
US 2018/0038407 A1 Feb. 8, 2018

(30) Foreign Application Priority Data

Feb. 16, 2015 (AU) .............................. 2015200771

(51) Int. Cl.
*F16B 45/00* (2006.01)
*A47G 25/06* (2006.01)

(52) U.S. Cl.
CPC ............. *F16B 45/00* (2013.01); *A47G 25/06* (2013.01)

(58) Field of Classification Search
CPC . F16L 3/08; F16L 3/2338; H02G 3/30; B65D 63/10; B65D 63/1018; B65D 63/1027; B65D 63/1063; B65D 63/1072; Y10T 24/1498; F16B 45/00; A47F 5/0815; B60R 7/10; A47G 25/06; F16G 11/14; F16G 11/143
USPC ....... 248/100, 301, 303, 304, 339, 470, 690, 248/692, 466; 211/13.1, 85.2, 70.6, 70.1, 211/113; 410/101, 96
See application file for complete search history.

(56) References Cited

U.S. PATENT DOCUMENTS

| 1,899,982 | A | * | 3/1933 | Olson | D06F 55/00 24/335 |
| 3,018,995 | A | * | 1/1962 | Oakley | B60P 7/0807 248/294.1 |
| D205,010 | S | * | 6/1966 | Swendsen | D8/356 |
| 3,257,971 | A | * | 6/1966 | Swendsen | B60P 7/0807 114/218 |
| 3,694,866 | A | * | 10/1972 | Maier | B60P 7/0807 24/115 J |
| D227,217 | S | * | 6/1973 | Pick | D8/356 |

(Continued)

FOREIGN PATENT DOCUMENTS

WO WO-03096845 A1 * 11/2003 ............... A47C 7/64

*Primary Examiner* — Kimberly T Wood

(57) ABSTRACT

In one preferred form of the present invention, there is provided hook system 10 for hanging school bags 18. The hook system 10 comprises: a body 10 providing a series of protective recesses 14 each having a projection 16. Each projection 16 allows a school bag to be hung therefrom using a top hanging strap 20 of the school bag 18. Each protective recess 14 shields the corresponding projection 16 to assist with preventing personal injury or eye damage associated with a person accidently moving towards the projection.

14 Claims, 10 Drawing Sheets

(56) References Cited

U.S. PATENT DOCUMENTS

| | | | | |
|---|---|---|---|---|
| 4,993,343 | A | * | 2/1991 | Czipri ................... B63B 35/815 |
| | | | | 114/218 |
| D317,561 | S | * | 6/1991 | Stubbings ..................... D12/317 |
| D382,793 | S | * | 8/1997 | Wilcox .......................... D8/356 |
| 5,863,092 | A | * | 1/1999 | Kifer ....................... B60R 7/043 |
| | | | | 211/12 |
| 6,089,370 | A | * | 7/2000 | Mughal ................... B65D 71/70 |
| | | | | 206/372 |
| 6,126,235 | A | * | 10/2000 | Grove ..................... A47C 7/425 |
| | | | | 297/188.03 |
| 6,131,993 | A | * | 10/2000 | Pesta ....................... B60R 7/043 |
| | | | | 297/183.7 |
| 6,142,561 | A | * | 11/2000 | Pesta ................... B60N 2/01508 |
| | | | | 248/304 |
| D482,831 | S | * | 11/2003 | Lemos ............................. D34/6 |
| 6,698,695 | B1 | * | 3/2004 | Spoto ....................... B60R 7/02 |
| | | | | 24/567 |
| D536,174 | S | * | 2/2007 | Charbeneau ................... D3/328 |
| 2012/0049474 | A1 | * | 3/2012 | Del Rosario ........... B62B 1/008 |
| | | | | 280/47.34 |

\* cited by examiner

Section A-A

HOOK SYSTEMS FOR HANGING SCHOOL BAGS

INCORPORATION BY REFERENCE

Priority is claimed from Australian Application 2015200771 filed 16 Feb. 2015 and entitled 'HOOK SYSTEMS FOR HANGING SCHOOL BAGS'. All parts and elements of Australian Application 2015200771 are hereby fully incorporated by reference for all purposes In one particular form, the present invention relates to hook systems for hanging school bags. The present invention is to be understood as not being limited thereto. The present invention may find application in hanging different types of bags and other items.

BACKGROUND TO THE INVENTION

Hook systems for hanging school bags are often provided at primary and secondary schools. One of the advantages of hanging school bags is that the school bags can be neatly hung in plain view to limit the possibility of tripping. They also help to organise the belongings of students and keep bags at an ideal height and off student seating.

It is against this background that the invention has been developed by the inventor.

SUMMARY OF THE INVENTION

According to a first aspect of preferred embodiments herein described there is provided a hook system for hanging school bags, the hook system comprising: a body providing a series of protective recesses each having a projection; each projection allowing a school bag to be hung therefrom using a top hanging strap of the school bag; each protective recess shielding the corresponding projection to assist with preventing personal injury or eye damage associated with a person accidently moving towards the projection.

The problems with bag hooks currently on the market concern the protrusion designed to support the load. Metal, wood or plastic bag hooks with protruding members from the wall are often placed above seating some distance above the ground where students congregate in large numbers. They are placed in corridors having a high level of student traffic. These bag hooks work as intended for the storage of bags, clothing and equipment but due to protruding parts they are a hazard and present a safety risk if anyone should bump into them. The protective recesses advantageously shield the hanging projections to assist with preventing personal injury or eye damage associated with a person accidently moving towards the projection.

Preferably each projection does not extend substantially beyond the opening of the corresponding protective recess.

Preferably each projection does not extend beyond the opening of the corresponding protective recess.

Preferably each projection provides a flat surface forming part of a front face of the body aligned in a forward facing plane.

Preferably each projection includes an inclined back portion located within the corresponding protective recess; the inclined back portion for holding the top strap of a school bag in a hanging condition.

Preferably the opening of each protective recess forms a double arm shape, such as a U-type or V-type shape, the double arm shape located directly above the corresponding projection in an inverted condition, when the hook system is fixed to a wall for hanging school bags therefrom.

Preferably each protective recess includes a base that slopes downwardly and prevents water accumulating in the recess when the hook system is fixed to a wall.

Preferably each protective recess forms an inverted symmetrical double arm shape, that extends furthest into the body at an apex of the recess and which gradually reduces in depth either side of the apex to a zero depth.

Preferably the body is provided in the form of a relatively thin walled structure with the contours of the walls of the body providing the recesses and projections in a unitary form.

Preferably the rear of the body includes two longitudinally extending recesses, the two longitudinally extending recesses disposed on opposed sides for being mounted to a support fixed to a wall.

Preferably the hook system includes the support, the support comprising an elongate element having two inwardly directed flange portions extending therealong for engaging the two longitudinal extending recesses.

Preferably the hook system includes the support, the support comprising an elongate element having two upwardly directed flange portions extending therealong for engaging the two longitudinal extending recesses.

According to another aspect of preferred embodiments herein described there is provided a hook system for hanging school bags, the hook system comprising: a body providing a protective recess having a projection; the projection having an inclined back portion located within the corresponding protective recess; the inclined back portion for holding the top strap of a school bag in a hanging condition.

Preferably the hook system allows a school bag to be hung therefrom using a top hanging strap of the school bag; the protective recess shielding the corresponding projection to assist with preventing personal injury or eye damage associated with a person accidently moving towards the projection.

A modular hook system may be provided, the hook system comprising a wall support and a series of hook systems as recited above, each hook system in the series being longitudinally aligned in the series to provide a section of the modular hook system.

It is to be appreciated that the present invention may find application in hanging other items. The present invention is not to be read as being limited to bags. The present invention could find application in hanging other items such as coats and towels.

It is to be recognised that other aspects, preferred forms and advantages of the present invention will be apparent from the present specification including the detailed description, drawings and claims.

BRIEF DESCRIPTION OF DRAWINGS

In order to facilitate a better understanding of the present invention, several preferred embodiments will now be described with reference to the accompanying drawings, in which.

DETAILED DESCRIPTION OF THE EMBODIMENTS

It is to be appreciated that each of the embodiments is specifically described and that the present invention is not to be construed as being limited to any specific feature or element of any one of the embodiments. Neither is the present invention to be construed as being limited to any feature of a number of the embodiments or variations described in relation to the embodiments.

Figure 1:
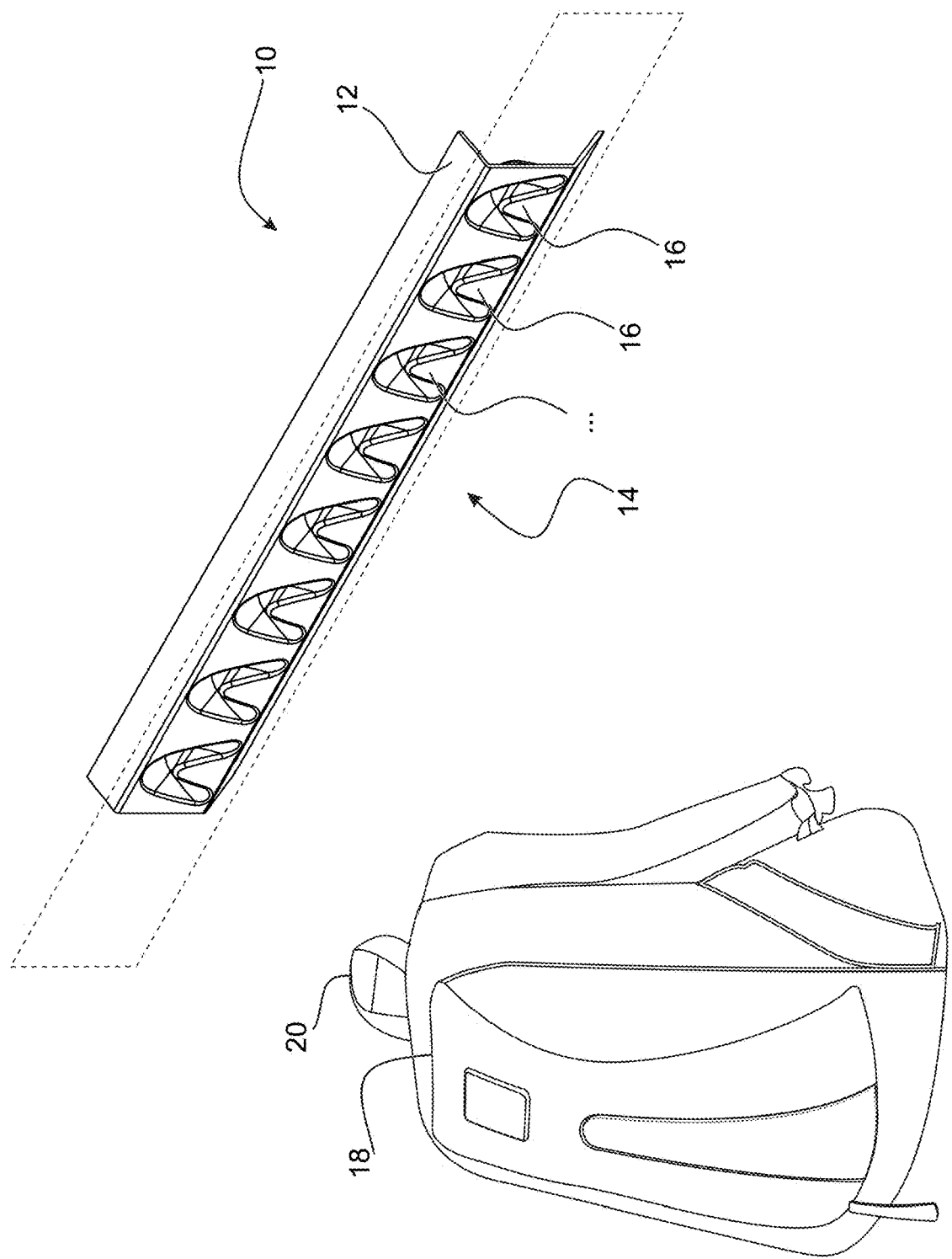
FIG. 1 provides a perspective view of a hook system for hanging bags having top hook straps, the hook system according to a first preferred embodiment of the present invention.

Referring to FIG. 1 there is shown a hook system 10 for hanging school bags according to a first preferred embodiment of the present invention. The hook system 10 comprises a body 12 providing a series of protective recesses 14 each having a projection 16. Each projection 16 allows a school bag 18 to be hung therefrom using a top hanging strap 20 of the school bag 18. Each protective recess 14 shields the corresponding projection 16 to assist with preventing personal injury or eye damage associated with an eye or other part of the body accidentally moving towards the projection.

Unlike many current hook systems it is considered that the hook system 10 advantageously allows for the storage of items such as bags, towels and clothing (from hangers having straps) to be carried out in an advantageously safe manner. Coats, towels, bathers and bathers hang just fine without a strap. A towel for instance is placed into the recess and may hold onto the hook by gravity. Coats are the same. The collar is placed into the recess and then gravity may keep it firm on the hook. The projections 16 do not extend dangerously from the body 12 and are shielded by the protective recesses 14. As such the hook system 10 does not have any protruding parts that would pose a hazard to the eye or other body parts of people around them.

Figure 2:
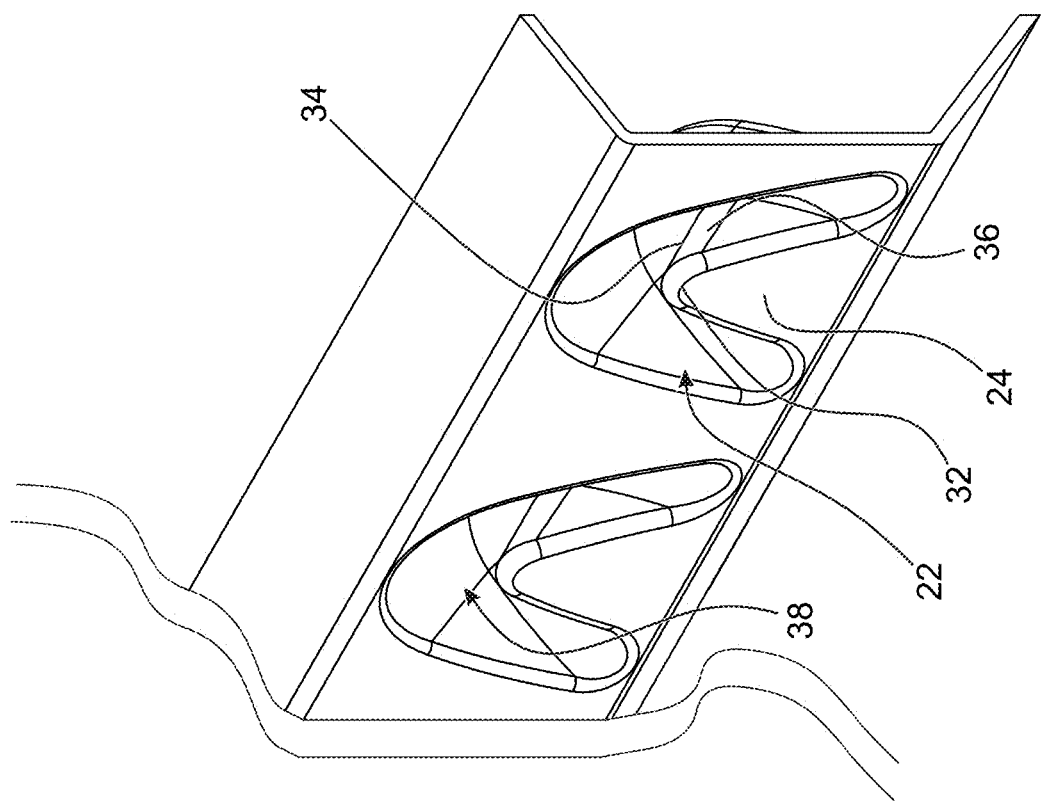
FIG. 2 provides an enlarged partial perspective view of a hook system shown in FIG. 1.
Figure 3:
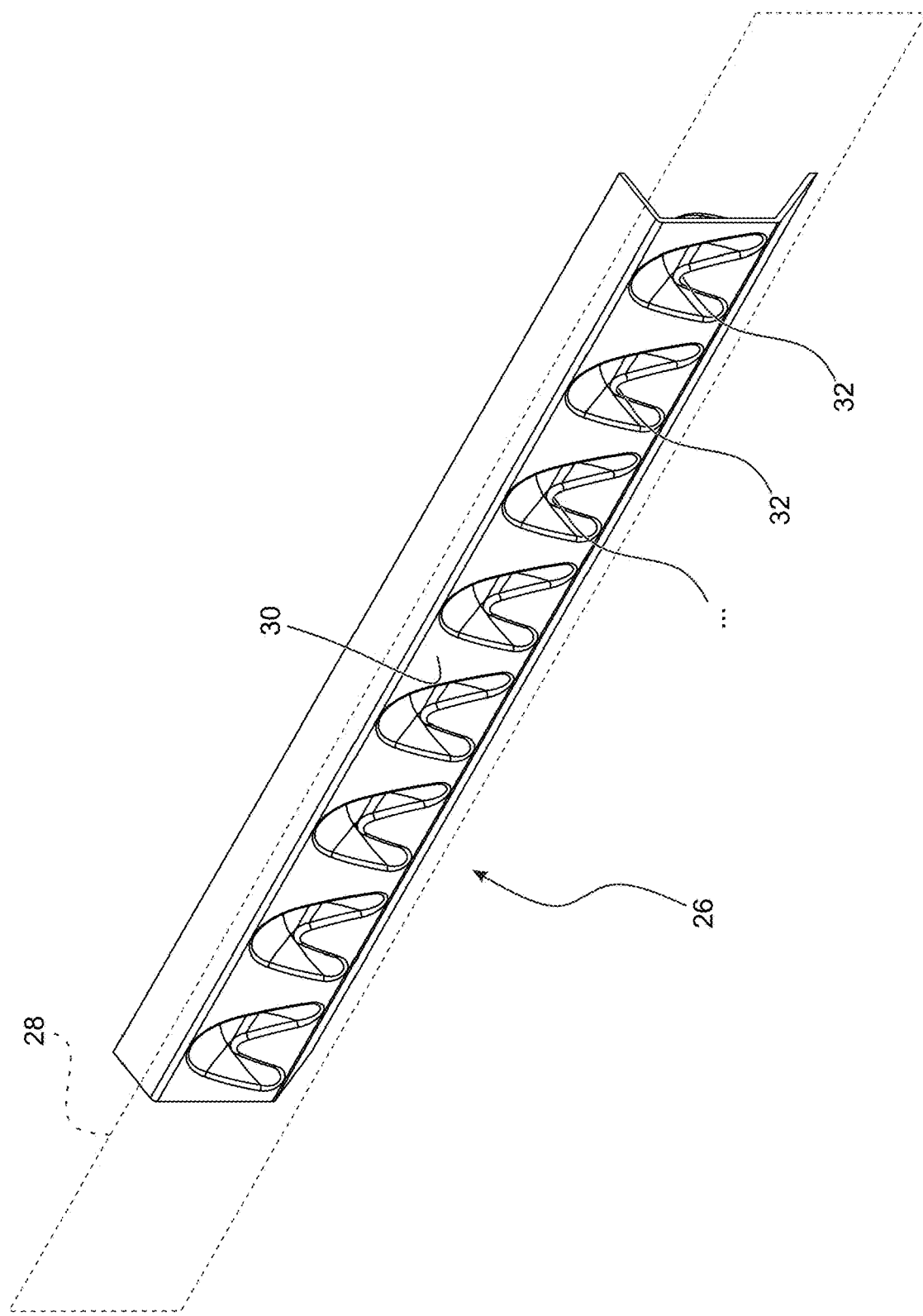
FIG. 3 provides a further perspective view of a hook system shown in FIG. 1.

Referring to FIGS. 2 and 3, each projection 16 does not extend beyond the opening 22 of the corresponding protective recess 14 provided by the body 12. Furthermore each projection 16 provides a flat surface 24 forming part of a front face 26 of the body 12 aligned in the corresponding forward facing plane 28. The front face 26 provided by the body 12 includes the surface 30 that extends around the recesses 14. The surface 30 includes the flat surfaces 24 provided by the projections 16. The flat surfaces 24 each have an apex 32 and extend inwardly upwardly as shown.

Each projection 16 includes an inclined back portion 34 that is located within the corresponding protective recess 14. The inclined back portion 34 extends downwardly from the apex 32 of the projection 16. The inclined back portion 34 provides an upwardly facing surface 36 that is directed into the corresponding recess 14 for holding the top strap 20 of the school bag 18 in a hanging condition. As would be apparent the top strap 20 is positioned to extend over the surface 36 with the school bag 18 hanging therefrom. The recess 14 is tapered and smooth to prevent objects being wedged in. The bag is released from the hook by lifting the bag slightly and moving it forward. This allows strap 20 to be freed from the projection 16.

The opening 22 of each protective recess 14 forms a double arm shape 38 of a V-type form.

The arm shape 38 is located directly above the corresponding projection 16 in an inverted condition as shown in FIGS. 1 and 2. Other shapes are of course possible. The V-type shape is presently preferred.

Figure 4C:
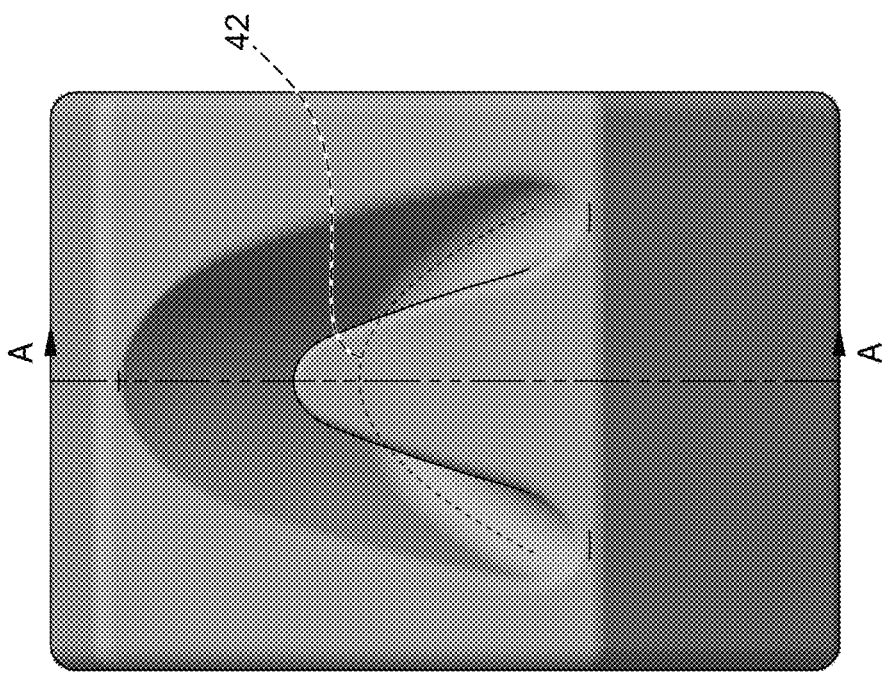
FIGS. 4a to 4c provide several views illustrating the construction of the hook system shown in FIG. 1.
Figure 4B:
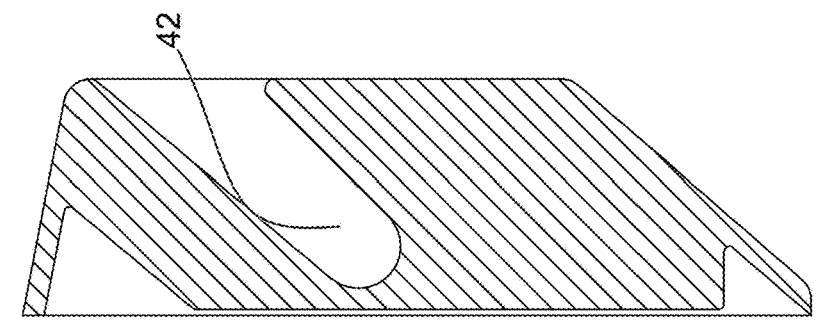
Figure 4A:
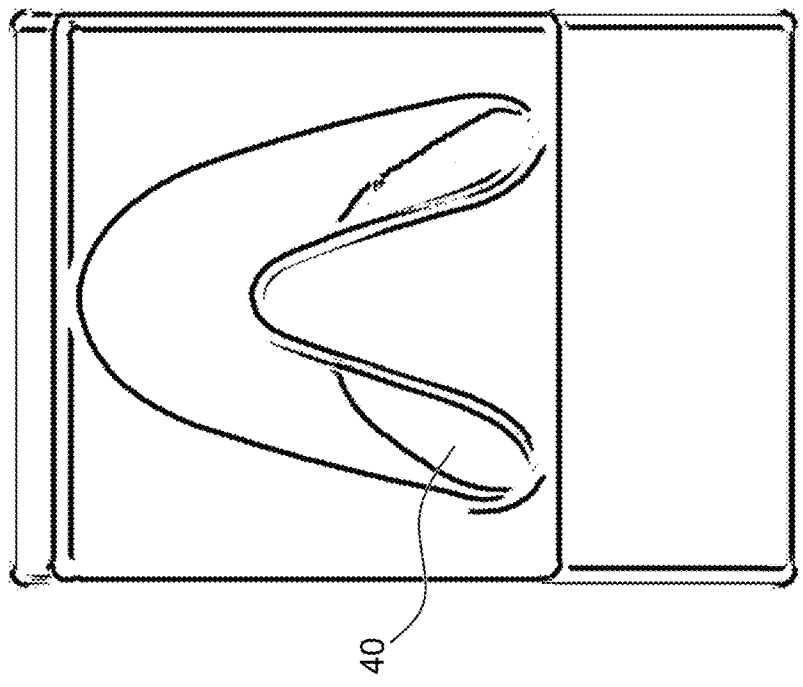

Referring to FIGS. 4*a* to 4*c*, each protective recess 14 includes a base 40 that slopes downwardly and prevents water accumulating in the recess 14 when the hook system is fixed to a wall. Each protective recess 14 forms an inverted symmetrical U-shape that extends furthest into the body at an apex 42 of the recess 14 and which gradually reduces in depth either side of the apex 42 to a zero depth. The base 40 is provided in a rounded, smooth from that extends downwardly in a linear manner to assist with water runoff.

Figure 5:
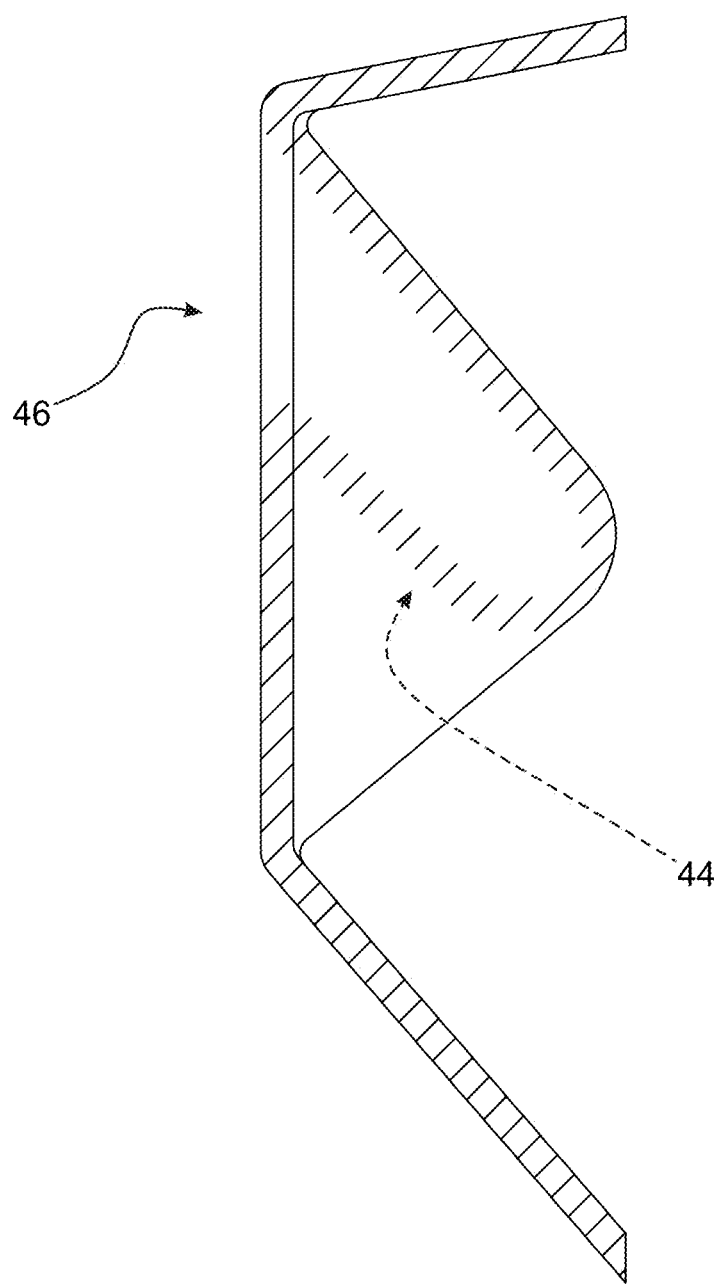
FIG. 5 provides a superimposed midline sectional view and a side view of the hook system shown in FIG. 1.

The body 12 is advantageously provided as a unitary body formed from plastics material. The body 12 is provided in the form of a relatively thin walled structure with the contours of the walls of the body 12 providing the protective recesses 14 and projections 16 in a unitary form. As would be apparent the body 12 is formed from injection moulding. The walls of the body 12 are illustrated in FIG. 5. A midline wall section 44 is shown superimposed on a side view 46.

The ability of the hook system to accommodate a conventional top hanging strap 20 of a schoolbag 18 without presenting a substantial eye injury or personal injury risk is considered advantageous. The embodiment provides a body 12 having a flat forward facing surface 26 that does not present a substantial eye injury or personal injury risk. Bags can be readily hung and do not need to be stored on the ground where they would present a tripping risk. The embodiment is also considered to be ideal for the storage of equipment including ICT equipment in bags or other applications where the safe storage of items is necessary.

Figure 6:
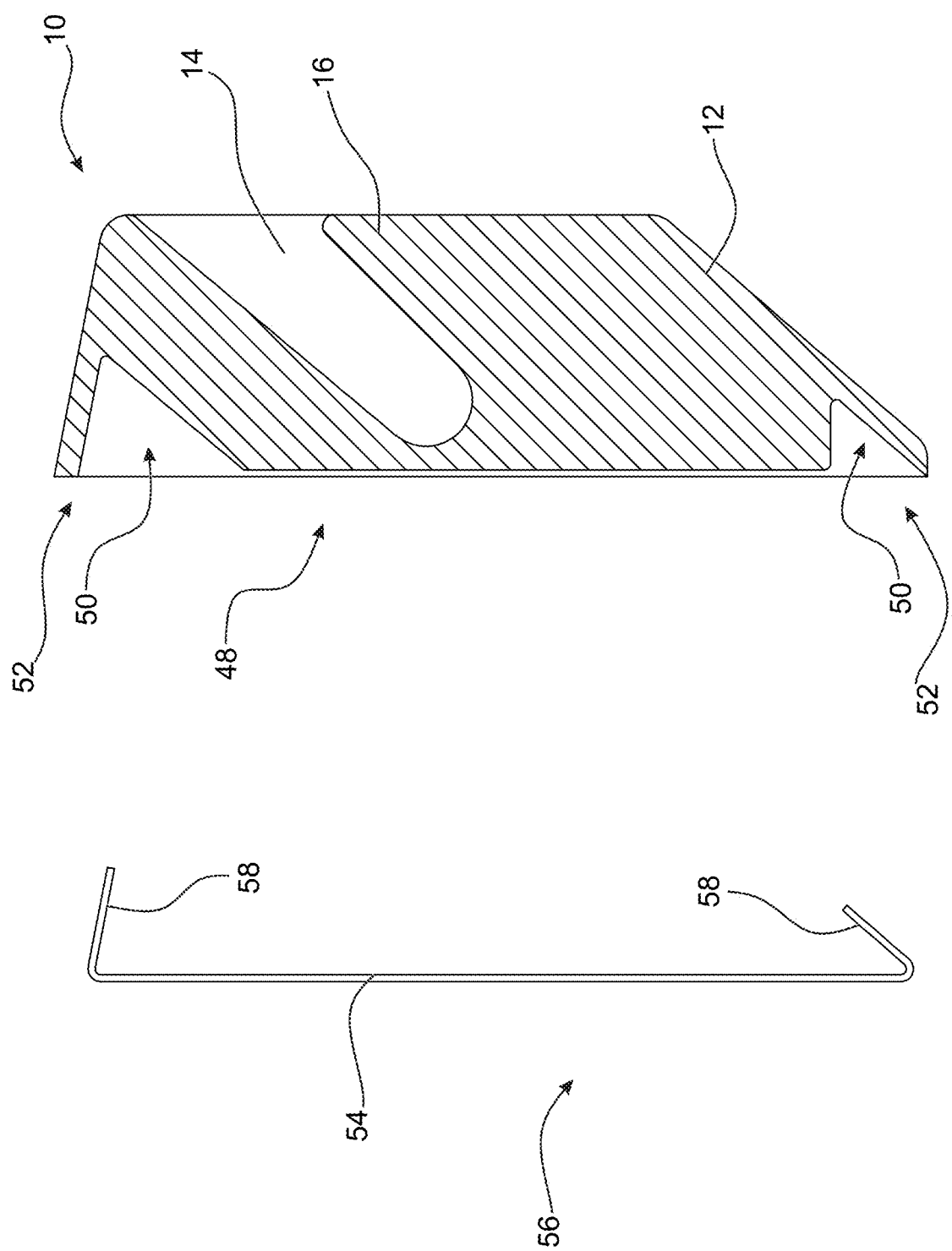
FIG. 6 provides a side schematic view of the hook system shown in FIG. 1.

Referring to FIG. 6, the rear 48 of the body 12 includes two longitudinally extending recesses 50 that extend along the rear 48 of the body 12. The recesses 50 are shown extending into the page. The two longitudinally extending recesses 50 are disposed on opposed sides 52 of the rear portion 48 for being mounted to a support 54 that is fixed to a wall. The support 54 comprises an elongate element 56 having two inwardly directed longitudinally extending flange portions 58 for engaging the two longitudinal extending recesses 50.

The flange portions 58 are fixed to recesses 50 by suitable mechanical fasteners such as rivets or security screws to provide a permanent fixture. The fasteners extend through the body 12 to hold the flange portion 58 in position.

The embodiments described provide projections 16 that function as hooks that are recessed into the moulded plastic body 12. The front face of the body 12 is flat and does not have any protruding portions. The projection 16 is recessed into the body 12 and is reclined so as to support the bag strap or other item, as it is placed into the recess 14. The recesses 14 each provide a slot. The item on the hook does not fall off due to the front section being higher than the inside slot.

The body 12 is formed from injection moulding. The features of the hook system 10 are evident from the description and drawings. As shown the front face 26 of the 'bag hook array' is flat and does not pose a hazard to eyes or other body parts even if students or others are pushed into them, lean up against them or brush against them while rushing past. The hook system 10 provides a bag hanging fixture.

The surface inside the moulded body 12, behind the front face, is where the bag strap is placed. The recessed section is easily able to support school bags, coats, clothing, sport bags or swimming towels. The removal of items is achieved by simply lifting and moving the item forward. The all in one moulded body is fixed to a metal plate which it attached to the wall with fasteners appropriate for the wall type. Other forms of moulding such as blow moulding could also be used in embodiments to manufacture the 'hook array'.

In locations where many hooks are needed the moulded sections could be placed end on end to supply enough hooks as needed. They could also be placed in rows on top of each other to supply more hooks. Hooks could also be moulded with an upper and lower row of hooks.

Figure 7:
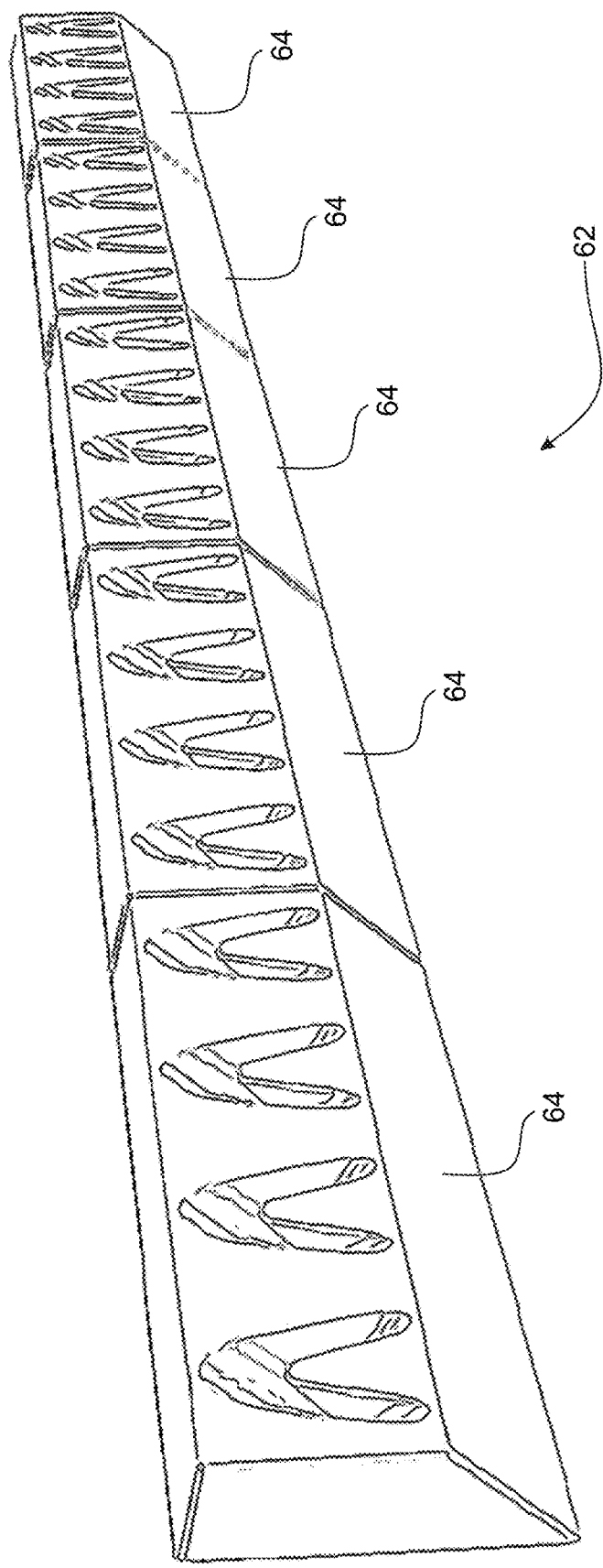
FIG. 7 provides a perspective view of a system according to further preferred embodiment of the present invention.

FIG. 7 illustrates an embodiment 62 in the form of a single row. There is provided a modular hook system 62 comprising a wall support (not shown) and a series of hook systems 64 of the general form described above. Each hook system in the array is longitudinally aligned to provide a section of the modular hook system 64.

The application to school environments would be apparent. The need for storing school bags is commonplace. These bags may contain such things as books, lunch boxes, ICT devices and sporting equipment and must be easily accessible at many times throughout the day.

Figure 8:
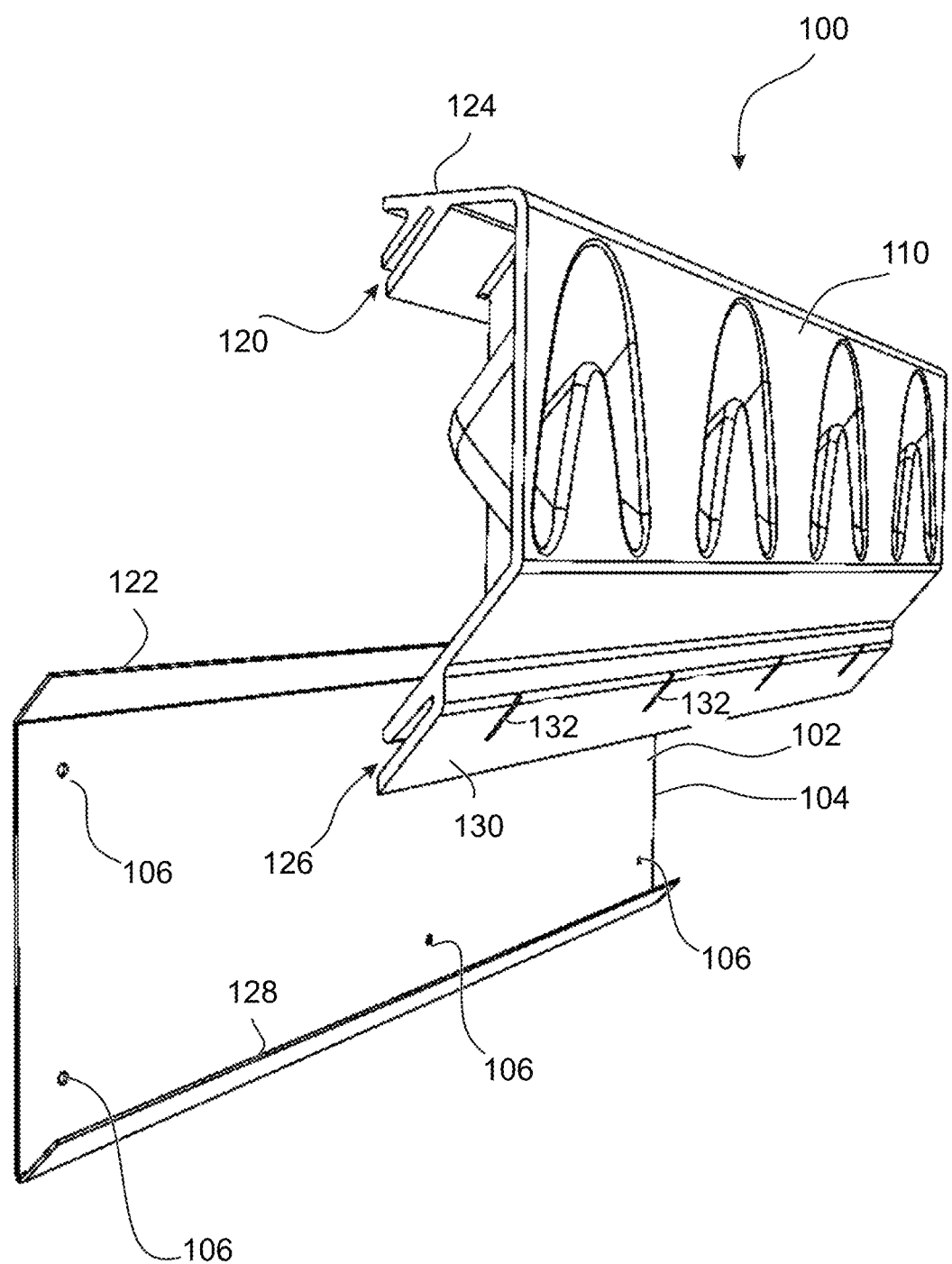
FIG. 8 provides a perspective view of hook system according to another preferred embodiment of the present invention.

FIG. 8 illustrates a hook system 100 according to a further preferred embodiment of the present invention. The hook system 100 includes a mount 102 having a body 104 for being mounted to a vertical surface.

Figure 9A:
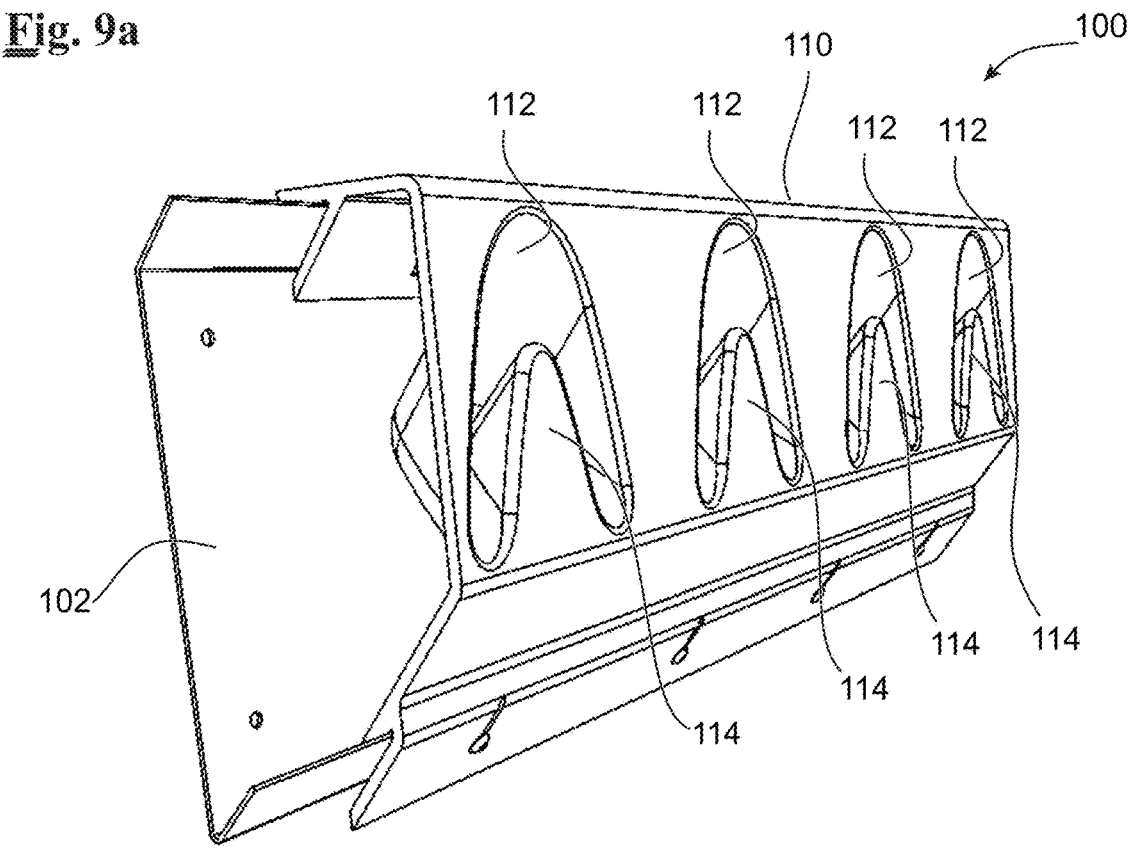
FIGS. 9*a* and 9*b* provide further views of the hook system shown in FIG. 8.
Figure 9B:
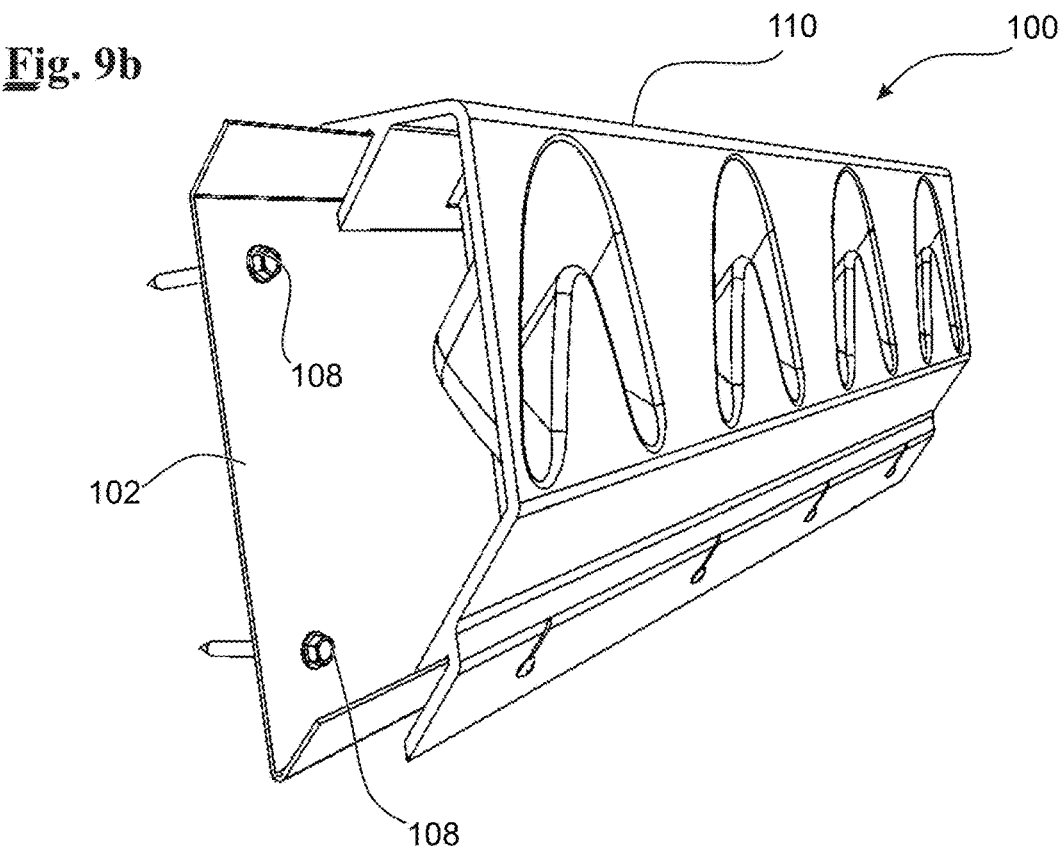

In the embodiment, the body 104 includes a number of holes 106 for receiving fasteners 108 (See FIG. 9a/b). The fasteners 108 comprise elongate fasteners that embed themselves into the wall and fix the mount 102 in position. As would be apparent the use of various forms of fastener are possible.

The hook system 100 includes a body 110 that is able to be fixed to the mount 102. The body 110 provides a series of recesses 112 each having a projection 114. Each projection 114 allows a school bag (not shown) to be hung therefrom using a top hanging strap (not shown) of the school bag. Each recess 112 shields the corresponding projection 114 to assist with preventing personal injury or eye damage associated with an eye or other part of the body accidently moving towards the projection.

The body 110 includes an upper recess 120 for receiving an upper flange 122 of the mount 102. The upper recess 120 is located beneath a flat upper portion 124 of the body 110.

In this arrangement, the upper edge 122 is inclined upwardly away from the wall. The flat upper edge 124 of the body 110 is inclined downwardly to assist with rain water runoff.

The body 110 includes a lower recess 126 for receiving a lower flange 128 of the mount 102. The lower recess 128 is located above a lower portion 130 of the body 110. The lower portion 130 includes a number of indents 132 for allowing fasteners to extend therethrough into the lower edge 128 of the mount. The indents 132 allow for ready spacing of the fasteners. In another embodiment the insets comprise depressions with the heads of the fasteners being received by the depressions.

The body 110 can be readily positioned on the mount by virtue of the inclined nature of the upper edge 122 and the lower edge 128 of the mount 102. This is achieved by sliding there along or by fitting over. The body 110 is firmly held in position without having to have screws extending through the upper edge 122. Screws merely extend through the lower flange 128.

Figure 10:
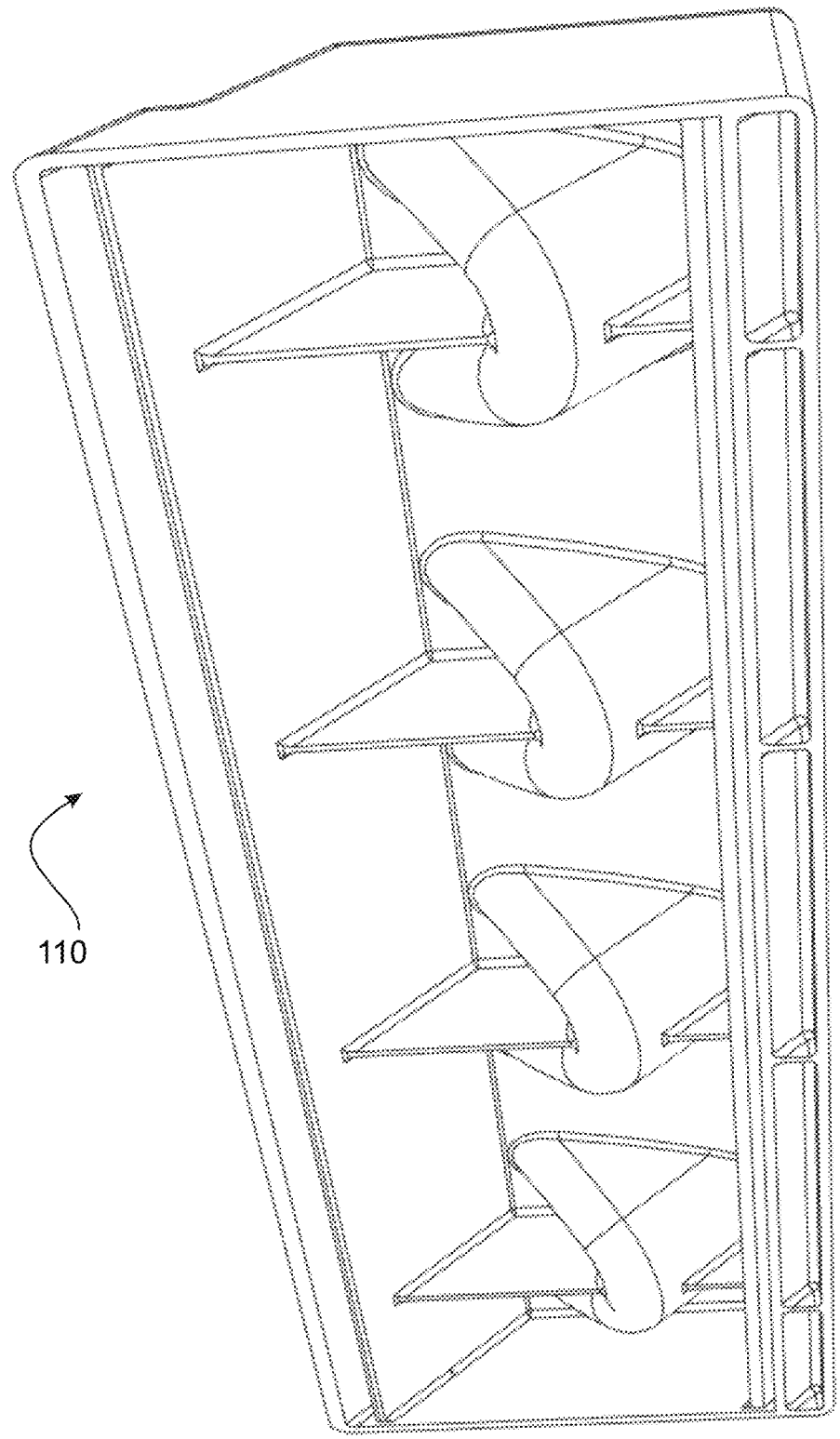
FIG. 10 provides a rear view of an element of the hook system shown in FIG. 8.

As would be apparent, the mount 102 provides a support 102 comprising an elongate element having two upwardly directed flange portions (the upper flange 122 and the lower flange 128) extend therealong for engaging the two longitudinal extending recesses. The recesses 120, 126 are shaped to receive the flanges. FIG. 10 provides a rear view of the body 110.

Embodiments could be installed in a variety of circumstances such as on walls. Embodiments could be provided on change room stands, walls or on the back of doors and above seating. It is considered the embodiments generally enable the neat storage of equipment in an advantageously safe manner. As with hook systems in general they allow the bags to be kept within reach of students but out of the way so as to not be a tripping hazard. Moreover, the protective recesses shield the projections to assist with preventing personal injury or eye damage associated with a person's eye or other body part accidently coming into contact with one of the projections.

As would be apparent, various alterations and equivalent forms may be provided without departing from the spirit and scope of the present invention. This includes modifications within the scope of the appended claims along with all modifications, alternative constructions and equivalents.

There is no intention to limit the present invention to the specific embodiments shown in the drawings. The present invention is to be construed beneficially to the applicant and the invention given its full scope.

In the present specification, the presence of particular features does not preclude the existence of further features. The words 'comprising', 'including' and 'having' are to be construed in an inclusive rather than an exclusive sense.

It is to be recognised that any discussion in the present specification is intended to explain the context of the present invention. It is not to be taken as an admission that the material discussed formed part of the prior art base or relevant general knowledge in any particular country or region.

The claims defining the invention are as follows:

1. A hook system for hanging school bags, the hook system comprising:
   a body having a front face and providing at least one protective recess, the at least one protective recess having an opening and a corresponding projection;
   the corresponding projection extending towards the opening and having an inclined back portion allowing a school bag to be hung therefrom using a top hanging strap of the school bag, the inclined back portion is inclined to allow a school bag to be released from the corresponding projection by lifting the bag slightly and moving the hanging strap of the school bag forward along the inclined back portion;
   the at least one protective recess having a base extending around the corresponding projection and ending at the front face of the body; the base being inclined downwardly from an end of the inclined back portion of the corresponding projection to the front face of the body for preventing water accumulating in the at least one protective recess when the hook system is fixed to a wall.

2. The hook system as claimed in claim 1, wherein the corresponding projection of the at least one protective recess does not extend substantially beyond the opening of the at least one protective recess.

3. The hook system as claimed in claim 1, wherein the corresponding projection of the at least one protective recess provides a flat surface forming part of the front face of the body aligned in a forward facing plane.

4. The hook system as claimed in claim 1, wherein the opening of the at least one protective recess forms a double arm shape, the double arm shape located directly above the corresponding projection in an inverted condition, when the hook system is fixed to the wall for hanging school bags therefrom.

5. A hook system as claimed in claim 4, wherein the double arm shape is a U-type or V-type style.

6. The hook system as claimed in claim 1, wherein the at least one protective recess forms an inverted symmetrical double arm shape, that extends farthest into the body at an apex of the at least one protective recess and which gradually reduces in depth either side of the apex to a zero depth.

7. The hook system as claimed in claim 1, wherein the body includes two longitudinally extending recesses, the two longitudinally extending recesses disposed on opposed sides for being mounted to a support fixed to a wall.

8. The hook system as claimed in claim 7 including the support, the support comprising an elongate element having two inwardly directed flange portions extending therealong for engaging the two longitudinal extending recesses.

9. The hook system as claimed in claim 7 including the support, the support comprising an elongate element having two upwardly directed flange portions extending therealong for engaging the two longitudinal extending recesses.

10. A modular hook system comprising a wall support and a series of hook systems as claimed in claim 1, each hook system in the series being longitudinally aligned in the series to provide a section of the modular hook system.

11. A hook system as claimed in claim 1, wherein walls of the at least one protective recess are tapered from the opening to the base to assist with limiting the ability of objects to be wedged in the at least one protective recess.

12. A hook system as claimed in claim 1, wherein the body is provided in the form of a relatively thin walled structure, and the body and the corresponding projection and walls of the at least one protective recess are a single one-piece component.

13. A hook system for hanging school bags, the hook system comprising:

a body having a front face and providing at least one protective recess, the at least one protective recess having an opening and a corresponding projection;

the corresponding projection extending towards the opening and having an inclined back portion allowing a school bag to be hung therefrom using a top hanging strap of the school bag; and the at least one protective recess having a base extending around the corresponding projection and ending at the front face of the body; the base being inclined downwardly from an end of the inclined back portion of the corresponding projection to the front face of the body for preventing water accumulating in the at least one protective recess when the hook system is fixed to a wall, wherein the at least one protective recess is tapered from the opening down to the base to assist with limiting the ability of objects to be wedged in the at least one recess.

14. A hook system for hanging school bags, the hook system comprising:

a body having a front face and providing at least one protective recess, the at least one protective recess having an opening and a corresponding projection, the body is provided in the form of a relatively thin walled structure, and the body and the corresponding projection and walls of the at least one protective recess are a single one-piece component;

the corresponding projection extending towards the opening and having an inclined back portion allowing a school bag to be hung therefrom using a top hanging strap of the school bag;

the at least one protective recess having a base extending around the corresponding projection and ending at the front face of the body; and the base being inclined downwardly from an end of the inclined back portion of the corresponding projection to the front face of the body for preventing water accumulating in the at least one protective recess when the hook system is fixed to a wall.

* * * * *